Patented July 1, 1952

2,602,073

UNITED STATES PATENT OFFICE 2,602,073

PROCESS FOR PREPARING SOLUTIONS

Edward L. Kropa, Old Greenwich, Conn., assignor to The Borden Company, New York, N. Y., a corporation of New Jersey No Drawing. Application May 9, 1949, Serial No. 92,244

7 Claims. (Cl. 260—32.8)

The present invention is directed to improvements in or relating to the production of solutions of comminuted organic materials such as vinyl or other high polymer polymers and articles prepared therefrom. In particular, this invention relates to methods for preparing vinyl or other high polymer compositions which may be used as binders, laminants, castings, coatings, or in the manufacture of shaped structures such as, for example, sheets, fibers, threads, rods, filaments, and the like.

The presence of air bubbles in such compositions may produce serious defects in the final product unless such bubbles are removed prior to use. In the production of fibers from vinyl resins, for example, the ideal solution or dispersion is one which is wholly free of air bubbles prior to its being forced through the nozzles of a spinneret. Unless this solution or dispersion is substantially free of air bubbles, each bubble as it passes through the nozzle will either impede or entirely disrupt the continuous flow of the solution or dispersion, producing broken ends, or else results in the formation of a hollow filament surrounded by a thin shell or polymer which forms a weak and porous structure yielding an over-all low tensile strength in the spun fiber. Furthermore, such air bubbles increase the tendency for the solution or dispersion to stick to the face of the spinneret, thus causing "blebs," roughness, or other irregularities along the fiber length as it is extruded. In the formation of films, the same mechanical imperfections are noticed, leading to films having voids or sunken areas in the finished object.

The problem is a serious one. Many methods have been proposed and as many attempts made for the removal of the air bubbles from vinyl solutions or dispersions prior to extrusion. For example, it has been proposed to simply allow the solution of the vinyl high polymers to stand at rest until all the air bubbles rise to the top, whereupon they are permitted to burst or become deflated. This practice, while simple enough, is very time consuming. Solutions of high polymers suitable for wet or dry spinning require usually a minimum of 12 to 15 hours standing, or longer, in order to allow the bubbles to rise to the surface. Such a method naturally necessitates extra storage space, a plurality of vessels, and various other equipment for pumping the solution into and out of storage.

More recently, other attempts have been made to eliminate the air bubbles such as, for example, by subjecting the vinyl solution to a vacuum treatment preferably at an elevated temperature. While the time element is considerably shortened by this method, that is, from one to two hours, this advantage is eliminated due to the tendency of the viscous solution to foam excessively, necessitating a very high freeboard in the vessel to allow space for the foamed solution. Moreover, when air is allowed to run back into the vessel, additional air may be entrapped in the viscous medium. Careful adjustment, therefore, must be made to the degree of vacuum applied to the solution, requiring constant watch over the controls.

It is therefore a general object of the present invention to provide a simple and efficient method for producing the vinyl solutions or dispersions substantially free from entrapped gas bubbles.

It is a further object of the present invention to provide a method for producing bubble-free vinyl solutions or dispersions of high polymers without the use of special or elaborate equipment.

It is a still further object of this invention to provide vinyl polymer solutions or dispersions satisfactory for use in forming shaped structions which are substantially free from "blebs" or other surface irregularities caused by the presence of air bubbles in the viscous mass during extrusion, casting, or precipitation.

Other objects of the invention will in part be obvious and will in part be apparent from the following detailed disclosures of the invention.

While it is not exactly known how air bubbles are formed in vinyl dispersions, the present theory indicates that most of the air bubbles normally occurring are found in any solution or dispersion made in the conventional manner are the result of air adsorbed on the surface of the granules of a high polymer and are not necessarily caused by the agitation required to cause the vinyl polymer to enter into solution, as has heretofore been commonly believed.

The invention, therefore, lies in the discovery that vinyl polymers may be made substantially free of air bubbles by removing the adsorbed air from the vinyl polymer prior to its solution. Inasmuch as the high polymer normally takes a considerable period of time to enter into solution, advantage is taken of this characteristic in preparing bubble-free solutions. However, in order to attain rapid solubility, a highly comminuted polymer is generally employed. Such a comminuted polymer possesses a large surface, which in turn allows it to introduce a large volume of air into the finished solution or dispersion. If a vacuum is applied to the suspension of the vinyl polymer in its solvent medium at a time prior to solution, the air bubbles may be removed or dissipated from the thin dispersion prior to solubility and consequent increase in viscosity. During the interval between suspension and solution, therefore, the air or other gaseous material which is adsorbed on the surface of the vinyl polymer can thus be separated and removed from the solution prior to the actual dissolution. The amount of vacuum employed may be varied considerably, but generally a vacuum of about 25 inches of mercury is ordinarily adequate for most purposes. Agitation may be provided by stirring or by vibrating the container holding the slurry, or by any other suitable methods or apparatus.

The solution of the high polymer may be hastened by agitation. While there is some hazard in introducing gas into the viscous solution during agitation, the gas thus introduced is usually in the form of relatively large-sized bubbles with a result that these large bubbles can be dissipated quickly and easily. Moreover, for spinning purposes, these viscous solutions are ordinarily filtered prior to use. Such filtering procedures may also introduce a few relatively large-sized bubbles. Since these bubbles are again large, they rise quickly and rapidly without difficulty. The solution is substantially free of any small bubbles formed or present in the solution.

Various high polymers may be deaerated in the manner described. These include polymers of vinyl compositions such as polystyrene, polyvinyl chloride, polyvinyl fluoride, polyvinyl cyanide (or polyacrylonitride), polyvinyl alcohol, polyvinyl acetate, polyvinyl acetal, polyvinyl ethers, polyvinylidene chloride, polyvinylidene fluoride, polyvinylidene fluorochloride, polyperfluorovinylchloride (or polytrifluorochloroethylene), and acrylic and methacrylic esters such as polymethylacrylate, polyethylacrylate, polymethylmethacrylate, polymethacrylonitrile, polyacrylamide, polymethacrylamide, as well as various copolymers of the above, such as, for example, the copolymers of acrylonitrile with vinyl chloride, vinyl acetate, acrylamide, and methacrylamide. The cellulose ethers may also be so deaerated.

Both organic liquids and inorganic materials may be used in order to form solutions. For example, the organic liquids customarily employed for dry spinning are volatile, such as acetone or methylethylketone. Alternatively, aqueous solutions such as those containing a high salt content may be employed.

No special equipment is necessary except a closed head mixing kettle which would be necessary in any case if compressed air is used to force the solution or dispersion of the vinyl polymer out of the tank. Moreover, no additional processing time is required since the deaeration may be conducted during the time ordinarily necessary for the solution to form.

Example 1

15 parts of polyvinyl alcohol was dissolved in water. The solution contained small air bubbles dispersed therein which could not be deaerated at reduced pressure because of the tendency to foam. 15 parts of polyvinyl alcohol were mixed with 85 parts of water and the mixture subjected to reduced pressure of 150 mm. of mercury for 30 minutes. The undissolved polymer was then stirred at 50° C. until solution took place. The slight amount of air which was entrapped was immediately dissipated to yield a clear solution. When this deaerated solution was subjected to a vacuum of 100 mm. there was no tendency to form bubbles even under these conditions.

Similar results were noted with carboxy methyl cellulose in water.

Example 2

A copolymer of vinyl chloride and vinyl acetate was suspended in methyl ethyl ketone. The solution of the polymer was allowed to occur. It was then subjected to vacuum with the result that it took approximately one hour for the solution to clear.

A similar suspension was subjected to vacuum of 150 mm. After 10 minutes under a vacuum the solution became clear except for the undissolved polymer. Mild agitation yielded a clear solution.

Example 3

A solution of polyvinyl acetate was prepared in benzene to form a composition containing 8.75 parts of polymer in benzene. During the solubilization small bubbles were entrapped.

A similar suspension was made up where the suspension was subjected to a vacuum of 110 mm. for approximately an hour. Further stirring at atmospheric pressure yielded a clear solution.

Example 4

Polyvinyl cyanide (or polyacrylonitrile) in finely divided form obtained by polymerizing the monomer in the substantial absence of oxygen, as disclosed in the method described by Bacon in the Transactions of the Faraday Society of 1946, vol. 42, pages 141–169, was suspended in dimethyl formamide. About 6 parts of polymer and 94 parts of organic liquid were used. The suspension was then subjected to a vacuum in order to remove occluded air. The suspension was then heated under mild agitation to approximately 100° C. to yield a light, clear solution.

Example 5

Polyvinyl cyanide (or polyacrylonitrile) was polymerized according to the method described in U. S. 2,140,048. The polymerization was conducted in a manner to eliminate traces of oxygen during the polymerization. The dried polymer in comminuted form was allowed to fall into a solution of calcium sulfocyanate which was maintained at a vacuum of approximately 150 mm. During the addition both deaeration and solution took place simultaneously yielding a solution suitable for filtration for use in fibers.

Similar results were secured when a warm solution approximately 60° C. of ethylene carbonate was substituted for the calcium sulfocyanate.

Example 6

Polymethacrylonitrile was polymerized by the method described by Kern and Fernow in the J. prakt Chem., 1942, 160, 303. The polymer in finely divided form was suspended in acetone and a vacuum applied in such a manner as to cause the suspension to boil. The vacuum was then released, solution allowed to occur to yield a clear medium suitable for dry spinning.

In connection with the present invention, the vacuum may be applied to assist the removal of large air bubbles incorporated during the initial deaeration.

Any one of the many variations may be employed in the practice of this invention. A partial vacuum may be drawn on the dry vinyl polymer, as well as on the liquid to be used for solution and the polymer then introduced into the medium, allowing deaeration to occur simultaneously with solution. Dyes, plasticizers, solvent softeners, and the like, may be introduced simultaneously with the polymer. While any sized polymer might be employed, it is generally desirable to use a finely comminuted polymer of mesh size from about 325 to 10 mesh.

Having described my invention, what I claim as new and desire to secure by Letters Patent is:

1. A dissolving process comprising the steps, in combination, of pulverizing a soluble resin to increase the surface thereof whereby solution rate is facilitated and adsorption of air is increased, submerging the pulverized resin in a simple solvent, and simultaneously beginning solution of said pulverized resin and applying a vacuum on the surface of said solvent whereby the combined vacuum and surface dissolving forces simultaneously act to remove adsorbed air from the surfaces of said pulverized resin at sufficient speed to permit of removal of substantially all air bubbles from the solvent before sufficient resin is dissolved to produce foaming of the solution.

2. The method of producing a relatively concentrated resin solution in a simple solvent comprising the steps, in combination, of pulverizing the resin to produce a relatively large surface in proportion to bulk to facilitate solution, which increased surface increases the amount of adsorbed air, submerging the pulverized resin with adsorbed air in the simple solvent and simultaneously with the submergence applying a vacuum upon the surface of said solvent whereby the solution forces and the vacuum cooperate simultaneously to remove the adsorbed air from the resin surfaces into the body of solvent under conditions of such volume as to obtain a rapid rate of rise of bubbles through the solution, and completing the vacuum treatment before sufficient resin has dissolved to increase the solution viscosity to such a point that foaming of the solution occurs under the influence of the vacuum.

3. The method of producing a relatively concentrated resin solution in a simple solvent comprising the steps, in combination, of pulverizing the resin to produce a relatively large surface in proportion to bulk to facilitate solution, which increased surface increases the amount of adsorbed air, submerging the pulverized resin with adsorbed air in the simple solvent and simultaneously with the submergence applying a vacuum, up to about 25 inches of mercury, upon the surface of said solvent whereby the solution forces and the vacuum cooperate simultaneously to remove the adsorbed air from the resin surfaces into the body of solvent under conditions of such volume as to obtain a rapid rate of rise of bubbles through the solution, and completing the vacuum treatment before sufficient resin has dissolved to increase the solution viscosity to such a point that foaming of the solution occurs under the influence of the vacuum.

4. A process for producing clear, substantially air-free solutions of vinyl polymers comprising the steps, in combination, of comminuting the solid vinyl polymer to increase the surface area and the dissolution rate as well as the amount of adsorbed air upon particles of solid polymer, thereafter submerging the comminuted vinyl polymer in methylethylketone and simultaneously applying a vacuum upon the surface of the methylethylketone as soon as solution starts; utilizing the combination of solution forces, surface tension relationships, and the vacuum to release the adsorbed air from the vinyl polymer under conditions of bubble volume such as to give rapid rate of rise through the solvent; and substantially completing the removal of air from the adsorbed surface and the solvent before sufficient polymer is dissolved to increase the viscosity of the solvent to a point where bubbles rise slowly through the solvent.

5. The method of producing a relatively concentrated resin solution in simple solvent comprising the steps, in combination, of pulverizing the resin to produce a relatively large surface in proportion to bulk to facilitate solution, which increased surface increases the amount of adsorbed air, submerging the pulverized resin with adsorbed air in the simple solvent and simultaneously with the submergence applying a vacuum upon the surface of said solvent whereby the solution forces and the vacuum cooperate simultaneously to remove the adsorbed air from the resin surfaces into the body of solvent under conditions of such volume as to obtain a rapid rate of rise of bubbles through the solution, completing the vacuum treatment before sufficient resin has dissolved to increase the solution viscosity to such a point that foaming of the solution occurs under the influence of the vacuum, and applying gentle stirring to the suspension of polymer in solvent to further speed the dislodgment of air.

6. The method of producing a relatively concentrated resin solution in simple solvent comprising the steps, in combination, of pulverizing the resin to produce a relatively large surface in proportion to bulk to facilitate solution, which increased surface increases the amount of adsorbed air, submerging the pulverized resin with adsorbed air in the simple solvent and simultaneously with the submergence applying a vacuum upon the surface of said solvent whereby the solution forces and the vacuum cooperate simultaneously to remove the adsorbed air from the resin surfaces into the body of solvent under conditions of such volume as to obtain a rapid rate of rise of bubbles through the solution, completing the vacuum treatment before sufficient resin has dissolved to increase the solution viscosity to such a point that foaming of the solution occurs under the influence of the vacuum, applying gentle stirring to the suspension of polymer in solvent to further speed the dislodgment of air, and thereafter continuing the stirring after dislodgment of air to speed the formation of a complete solution, both stirring treatments being applied in the presence of a vacuum to minimize the occlusion of air from the stirring operation.

7. A process for producing clear, substantially air-free solutions of a polymer selected from the list consisting of polystyrene, polyvinyl chloride, polyvinyl fluoride, polyvinyl cyanide, polyvinyl alcohol, polyvinyl acetate, polyvinyl acetal, polyvinyl ethers, polyvinylidene chloride, polyvinylidene fluoride, polyvinylidene fluorochloride, polyperfluorovinylchloride, and polymethylacrylate, polyethylacrylate, polymethylmethacrylate, polymethacrylonitrile, polyacrylamide, and polymethacrylamide, comprising the steps, in combination, of comminuting the solid polymer to increase the surface area and the dissolution rate as well as the amount of adsorbed air upon particles of solid polymer, thereafter submerging the comminuted polymer in a solvent and simultaneously applying a vacuum upon the surface of the solvent as soon as solution starts; utilizing the combination of solution forces, surface tension relationships, and the vacuum to release the adsorbed air from the polymer under conditions of bubble volume such as to give rapid rate of rise through the solvent; and substantially completing the removal of air from the adsorbed surface and the solvent before sufficient polymer is dissolved to increase the viscosity of the solvent to a point where bubbles rise slowly through the solvent.

EDWARD L. KROPA.

REFERENCES CITED

The following references are of record in the file of this patent:

UNITED STATES PATENTS

| Number | Name | Date |
|---|---|---|
| 1,895,192 | Kampf | Jan. 24, 1933 |
| 2,469,546 | Calhoun et al. | May 10, 1949 |